(12) United States Patent
Koritnik et al.

(10) Patent No.: US 9,104,639 B2
(45) Date of Patent: Aug. 11, 2015

(54) DISTRIBUTED MESH-BASED MEMORY AND COMPUTING ARCHITECTURE

(75) Inventors: Brett Koritnik, Centennial, CO (US); Kirk Sprague, Elizabeth, CO (US)

(73) Assignee: SEAKR Engineering, Inc., Centennial, CO (US)

( * ) Notice: Subject to any disclaimer, the term of this patent is extended or adjusted under 35 U.S.C. 154(b) by 186 days.

(21) Appl. No.: 13/461,618

(22) Filed: May 1, 2012

(65) Prior Publication Data

US 2013/0297847 A1    Nov. 7, 2013

(51) Int. Cl.

| | |
|---|---|
| *G06F 15/173* | (2006.01) |
| *G06F 11/20* | (2006.01) |
| *H04L 12/939* | (2013.01) |
| *G06F 11/30* | (2006.01) |
| *H04L 12/933* | (2013.01) |
| *G06F 13/14* | (2006.01) |

(52) U.S. Cl.
CPC ........ *G06F 15/17381* (2013.01); *G06F 11/202* (2013.01); *G06F 11/2017* (2013.01); *G06F 11/2028* (2013.01); *G06F 11/3048* (2013.01); *G06F 13/14* (2013.01); *H04L 49/10* (2013.01); *H04L 49/15* (2013.01); *H04L 49/1523* (2013.01)

(58) Field of Classification Search
CPC ... G06F 13/14; G06F 11/2017; G06F 11/202; G06F 11/2028; G06F 11/3048; G06F 15/17381; H04L 49/10; H04L 49/15; H04L 49/1523
USPC .......................................................... 710/316
See application file for complete search history.

(56) References Cited

U.S. PATENT DOCUMENTS

| | | | |
|---|---|---|---|
| 4,797,882 A * | 1/1989 | Maxemchuk ................. | 370/406 |
| 5,754,563 A | 5/1998 | White | |
| 6,104,211 A | 8/2000 | Alfke | |
| 6,141,770 A | 10/2000 | Fuchs et al. | |
| 6,275,975 B1 * | 8/2001 | Lambrecht et al. .......... | 716/130 |
| 6,298,289 B1 | 10/2001 | Lloyd et al. | |

(Continued)

FOREIGN PATENT DOCUMENTS

| | | |
|---|---|---|
| CN | 101872333 A | 10/2010 |
| CN | 107872333 | 10/2010 |
| EP | 1625484 A | 3/2005 |

OTHER PUBLICATIONS

"GOES I-M DataBook"; National Aeronautics and Space Administration; Revision 1; Aug. 31, 1996; pp. i-vii,102-106.*

(Continued)

*Primary Examiner* — Ryan Stiglic
(74) *Attorney, Agent, or Firm* — Perkins Coie LLP

(57) ABSTRACT

Methods, systems, and devices for distributed computing are provided. Clusters of nodes are provided, each node have a communication link to a primary I/O switch as well as to two other nodes, thereby providing redundant alternative communication paths between different components of the system. Primary and redundant I/O switching modules may provide further redundancy for high availability and high reliability applications, such as applications that may be subjected to the environment as would be found in space, including radiation effects. Nodes in a cluster may provide data storage, processing, and/or input/output functions, as well as one or more alternate communications paths between system components. Multiple clusters of nodes may be coupled together to provide enhanced performance and/or reliability.

23 Claims, 11 Drawing Sheets

(56) References Cited

U.S. PATENT DOCUMENTS

| | | | |
|---|---|---|---|
| 6,304,568 B1 | 10/2001 | Kim | |
| 6,469,901 B1 | 10/2002 | Costner | |
| 6,587,470 B1* | 7/2003 | Elliot et al. | 370/404 |
| 6,611,526 B1 | 8/2003 | Chinnaswamy et al. | |
| 6,674,727 B1 | 1/2004 | Carroll et al. | |
| 6,859,882 B2* | 2/2005 | Fung | 713/300 |
| 6,954,875 B2 | 10/2005 | Liu | |
| 7,134,011 B2* | 11/2006 | Fung | 713/100 |
| 7,151,741 B1* | 12/2006 | Elliot et al. | 370/218 |
| 7,159,062 B2 | 1/2007 | Byers et al. | |
| 7,218,640 B2 | 5/2007 | Lebizay et al. | |
| 7,231,430 B2 | 6/2007 | Brownell et al. | |
| 7,237,129 B2* | 6/2007 | Fung | 713/323 |
| 7,263,631 B2 | 8/2007 | VanBuren | |
| 7,281,055 B2* | 10/2007 | Glasco et al. | 709/232 |
| 7,376,353 B2* | 5/2008 | Xie | 398/147 |
| 7,436,824 B2 | 10/2008 | Pepenella | |
| 7,437,599 B2 | 10/2008 | Hillman | |
| 7,475,326 B2 | 1/2009 | Hillman | |
| 7,539,914 B1 | 5/2009 | Sundararajan et al. | |
| 7,568,136 B2 | 7/2009 | Reblewski et al. | |
| 7,586,953 B2* | 9/2009 | Forest et al. | 370/503 |
| 7,590,904 B2 | 9/2009 | Ng et al. | |
| 7,647,543 B2 | 1/2010 | Ng et al. | |
| 7,669,097 B1 | 2/2010 | Teig et al. | |
| 7,702,978 B2 | 4/2010 | Lewis et al. | |
| 7,865,655 B2* | 1/2011 | Li et al. | 710/316 |
| 7,870,365 B1 | 1/2011 | Cismas et al. | |
| 7,949,711 B2 | 5/2011 | Chang et al. | |
| 8,010,871 B1 | 8/2011 | Kow et al. | |
| 8,032,817 B2 | 10/2011 | Ngo | |
| 8,050,256 B1 | 11/2011 | Bao et al. | |
| 8,209,373 B2* | 6/2012 | Ellis, III | 709/201 |
| 8,370,517 B2* | 2/2013 | Bohrer et al. | 709/232 |
| 8,627,444 B2* | 1/2014 | Ellis | 726/11 |
| 2002/0007464 A1* | 1/2002 | Fung | 713/320 |
| 2003/0048797 A1 | 3/2003 | Sandstrom | 370/402 |
| 2003/0074464 A1* | 4/2003 | Bohrer et al. | 709/232 |
| 2003/0188208 A1* | 10/2003 | Fung | 713/320 |
| 2003/0188219 A1 | 10/2003 | DeRuiter et al. | |
| 2003/0196126 A1* | 10/2003 | Fung | 713/300 |
| 2003/0200473 A1* | 10/2003 | Fung | 713/320 |
| 2004/0022022 A1* | 2/2004 | Voge | 361/684 |
| 2004/0078103 A1* | 4/2004 | Marshall et al. | 700/87 |
| 2004/0131065 A1 | 7/2004 | Sandy et al. | |
| 2004/0215931 A1* | 10/2004 | Ellis | 712/36 |
| 2005/0108582 A1* | 5/2005 | Fung | 713/300 |
| 2005/0180546 A1* | 8/2005 | Chraplyvy | 379/56.1 |
| 2005/0271036 A1* | 12/2005 | Cohen et al. | 370/351 |
| 2006/0080416 A1* | 4/2006 | Gandhi | 709/220 |
| 2006/0177226 A1* | 8/2006 | Ellis, III | 398/116 |
| 2006/0248325 A1* | 11/2006 | Fung | 713/1 |
| 2006/0248358 A1* | 11/2006 | Fung | 713/300 |
| 2006/0248359 A1* | 11/2006 | Fung | 713/300 |
| 2006/0248360 A1* | 11/2006 | Fung | 713/300 |
| 2006/0248361 A1* | 11/2006 | Fung | 713/300 |
| 2006/0253717 A1* | 11/2006 | Fung | 713/300 |
| 2006/0259796 A1* | 11/2006 | Fung | 713/300 |
| 2006/0259797 A1* | 11/2006 | Fung | 713/300 |
| 2007/0101173 A1* | 5/2007 | Fung | 713/300 |
| 2007/0214105 A1* | 9/2007 | Sfarti et al. | 707/2 |
| 2008/0025208 A1* | 1/2008 | Chan | 370/217 |
| 2008/0170580 A1* | 7/2008 | Goldman et al. | 370/406 |
| 2008/0184259 A1* | 7/2008 | Lesartre et al. | 719/312 |
| 2008/0273499 A1* | 11/2008 | Jeon et al. | 370/331 |
| 2009/0024829 A1* | 1/2009 | Deng et al. | 712/12 |
| 2009/0106633 A1 | 4/2009 | Fujiwara et al. | |
| 2009/0282092 A1* | 11/2009 | Ellis | 709/201 |
| 2010/0088565 A1 | 4/2010 | Chandra | |
| 2010/0191911 A1 | 7/2010 | Heddes et al. | |
| 2012/0096211 A1 | 4/2012 | Davis et al. | |
| 2013/0179963 A1* | 7/2013 | Ellis | 726/11 |

OTHER PUBLICATIONS

Satyen Sukhtankar et al., 'A Novel Switch for Architecture for High-performance Computing and Signal Processing Networks', Network Computing and Applications, Aug. 30, 2004, pp. 215-222.

Kang G. Shin et al., 'A Distributed I/O Architecture for Harts', Computer Architecture, May 28, 1990, pp. 332-342.

Notification of Transmittal of the International Search Report and the Written Opinion of the International Searching Authority, or the Declaration re PCT/US2013/039137 mailed on Aug. 23, 2013, 12 pages.

* cited by examiner

DISTRIBUTED MESH-BASED MEMORY AND COMPUTING ARCHITECTURE

FIELD

The present disclosure relates generally to distributed computing and/or memory architectures and, more specifically, to a mesh topology that allows high bandwidth and redundant interconnects between nodes within the system.

BACKGROUND

Various topologies are known for enabling data communications between various computing components. Two common topologies are the bus and star topologies. Bus topologies use a multi-drop configuration to connect a variety of resources. For example, processing, memory, and input/output (I/O) components may be interconnected with a bus, using the bus to transfer data between the different components. Such a bus is commonly incorporated into a backplane that is used to interconnect different components. In systems requiring relatively high amounts of data transfer, however, bus topologies can limit system performance. For example, bus-based architectures using present day bus technology generally have a limit of approximately 2 Gigabits/second (Gbps) per backplane bus. Thus, systems requiring higher throughput may employ multiple backplane busses, which can present I/O challenges. Furthermore, bus architectures may present reliability concerns, as any resource on the bus can compromise the integrity of the whole system. In systems requiring high reliability, this can be a significant design consideration. For example, in a space environment, radiation effects may require that various electronic designs be capable of high-reliability even in the event of detrimental radiation effects on the electronic systems.

For example, radiation effects on electronics systems in a space environment generally fit into one of two categories, destructive (permanent) or non-destructive (not permanent). Destructive radiation effects, for the types of components as would be typically used to construct this type of system, may include single event latchup (SEL) and total ionizing dose (TID). Other destructive effects may also include single event dielectric rupture (SEDGR), single event gate rupture (SEGR) and single event gate burnout (SEB). Single event type errors can occur at any point in the mission duration. TID is a cumulative effect is generally more likely to occur later in a mission. Non-destructive radiation effects include single event upset (SEU), single event functional interrupt (SEFI), and single event transient (SET). SEU, SEFI and SET generally require mitigation at the system level. Some classes of these errors may require ground intervention. In any event, high reliability systems to be used in such applications may be required to continue operation after such events.

Traditional star topologies include multiple nodes that use point-to-point connections from each node to send/receive data from a central resource or switching function. Data transfer may be accomplished through data packets that comprise a header portion that instructs the switching function as to the destination node of the packet. In traditional star topologies, each packet sent by a node must pass through the switching function so that switching function can route the packet to its destination node. The switching function in such networks may be incorporated in a switch card in a chassis, for example, which provides the data/packet distribution for the system. Each node in such a star system may be an individual payload or a sub-network, and can be a leg on a star of the next layer in a hierarchy. Star topologies require redundancy to provide reliability. Reliance on a single switching function can cause a loss of all elements below a failure point. Dual star topologies may be used for high availability applications. However, even in a dual star configuration, the star topology still has a "choke" point that may restrict the speed and efficiency of packet transfer and may create a potential failure point within a network. In applications that require high reliability and high availability, a failure in such a network may not be able to be tolerated.

SUMMARY

Methods, systems, and devices for distributed computing are provided. Clusters of nodes are provided, each node have a communication link to a primary I/O switch as well as to two other nodes, thereby providing redundant alternative communication paths between different components of the system. Primary and redundant I/O switching modules may provide further redundancy for high availability and high reliability applications, such as applications that may be subjected to radiation effects such as described above Nodes in a cluster may provide data storage, processing, and/or input/output functions, as well as one or more alternate communications paths between system components. Multiple clusters of nodes may be coupled together to provide enhanced performance and/or reliability.

According to one set of embodiments, a distributed computing system comprises: an input/output (I/O) switch module comprising a number of communications modules and configured to transmit and receive data and/or control information on a number of channels over the number of communications modules; and a number of nodes each comprising a number of communications modules and one or more of a memory module, a processing module, or an input/output (I/O) module, wherein each of the communications modules are coupled to transmit and receive data to and from at least two other nodes and the I/O switch. The communications modules may transmit and receive data in data packets, the data packets comprising a header with address information and a payload. The communications modules, according to some embodiments, may comprise serializer/deserializer modules. In some embodiments, the I/O switch comprises an external I/O interface, and connections between each node have different data rate then the data rate of the external I/O interface.

In other embodiments, the system further comprises a secondary I/O switch module that comprises a number of communications modules and is configured to transmit and receive data to and from the number of nodes on a number of channels over the number of communications modules. In some such embodiments, each of the number of nodes is coupled with two other nodes, the I/O switch, and secondary I/O switch, and each I/O switch may comprise an external I/O interface. Connections between each node may have different data rates than a data rate of the external I/O interfaces, and in one example each external I/O interface is capable of supporting data rates of approximately 40 Gbps and connections between each node are capable of supporting data rates of approximately 10 Gbps. The I/O switch may be coupled with a primary controller and the secondary I/O switch may be coupled with redundant controller. Such systems may be housed, for example, in a space-born vehicle. The nodes may comprise memory modules, with the memory modules and the I/O switch module forming a solid state recorder. In some embodiments, a first subset of the number of nodes comprise non-volatile memory modules and a second subset of the number of nodes comprise volatile memory modules. The number of nodes may comprise eight nodes, each node comprising four communications modules, and wherein two of the communications modules are coupled with other nodes, and two of the communications modules are coupled with the I/O switch and secondary I/O switch modules.

In other embodiments a node in a distributed switch fabric network is provided. The node in such embodiments may comprise: a number of communications modules coupled to transmit and receive communications to and from at least two other nodes and at least one I/O switch module; and one or more of a memory module, a processing module, or an input/output (I/O) module. The number of communications modules may further be coupled to transmit and receive communications to and from a secondary I/O switch module. In some embodiments, the number of communications modules are configured to: receive packets of data each comprising a header with address information and a payload; and forward one or more packets to another node based on the address information.

In still other embodiments, a method of processing a plurality of packets in a distributed computing system is provided. The method of such embodiments may comprise: at a first node having a number of communications modules, receiving a number of packets on a number of channels, each packet comprising a header with address information and a payload, wherein the number of communications modules are coupled with a second node, a third node, and a first I/O switch module; storing data included in the payload when address information corresponds to an address of the first node; forwarding one or more packets to the second node when address information of the packets corresponds to the second node; forwarding one or more packets to a fourth node via the second node when address information of the packets corresponds to the fourth node; and sending one or more packets to the first I/O switch module responsive to a command to transmit data to a location external to the distributed computing system. The method may also include: determining that the first I/O switch module has failed; and sending one or more packets to a second I/O switch module responsive to a command to transmit data to a location external to the distributed computing system. The distributed computing system of some embodiments comprises eight nodes, and each of the nodes is coupled with two other nodes, the I/O switch, and secondary I/O switch. The I/O switch may be coupled with a primary controller and the secondary I/O switch may be coupled with redundant controller. In some embodiments, connections between each node have different data rates than a data rate of the external I/O interfaces.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices for distributed computing are provided. Clusters of nodes are provided, each node have a communication link to a primary I/O switch as well as to two other nodes, thereby providing redundant alternative communication paths between different components of the system. Primary and redundant I/O switching modules may provide further redundancy for high availability and high reliability applications. Nodes in a cluster may provide data storage, processing, and/or input/output functions. Multiple clusters of nodes may be coupled together to provide enhanced performance and/or reliability.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
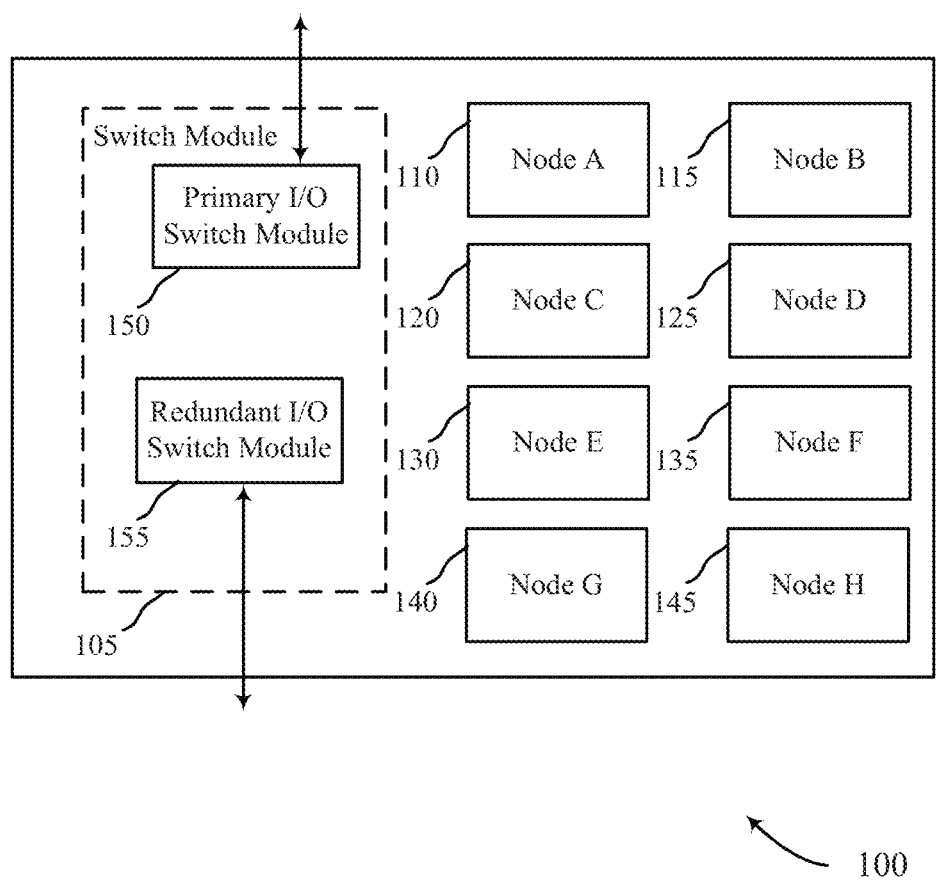
FIG. 1 shows a block diagram of a distributed computing system in accordance with various embodiments.

Referring first to FIG. 1, a block diagram illustrates an example of a distributed computing system 100 in accordance with various embodiments. The system 100 includes an input/output (I/O) switch module 105 and a plurality of nodes, node A 110 through node H 145. In the embodiment of FIG. 1, I/O switch module 105 includes a primary I/O switch module 150 and a redundant I/O switch module 155. While both the primary I/O switch module 150 and redundant I/O switch module 155 are illustrated within switch module 105, it will be readily understood that each of these switch modules 150 and 155 may be located physically separately from one another and may have separate power sources, in order to provide redundant switching capability. In some embodiments, each I/O switch module 150, 155, is communicatively coupled with each of the nodes 110-145. Furthermore, in some embodiments, each node 110-145 may be communicatively coupled with two other of nodes 110-145, thereby providing alternate communication paths between different nodes 110-145. Various examples of topologies of nodes 110-145 and switches 150, 155, will be described in more detail below.

Some embodiments of the present disclosure can be used to handle situations in which one or more nodes 110-145 and/or switches 150, 155, encounters a fault. For example, a fault can arise from the interaction of ionizing radiation with processor(s) and/or memory device(s) located within the nodes 110-145 or switches 150, 155, Specific examples of ionizing radiation include highly-energetic particles such as protons, heavy ions, electrons, and neutrons. A flux of highly-energetic particles can be present in environments including terrestrial and space environments. As used herein, the phrase "space environment" refers to the region beyond about 50 miles (80 km) in altitude above the earth.

Faults can arise from any source in any application environment such as from the interaction of ionizing radiation with one or more of the processors or memories. In particular, faults can arise from the interaction of ionizing radiation with the processor(s) in the space environment. It should be appreciated that ionizing radiation can also arise in other ways, for example, from impurities in solder used in the assembly of electronic components and circuits containing electronic components. These impurities typically cause a very small fraction (e.g., <<1%) of the error rate observed in space radiation environments.

Various embodiments can be constructed and adapted for use in a space environment, generally considered as 80 km altitude or greater, and included as part of the electronics system of one or more of the following: a satellite, or spacecraft, a space probe, a space exploration craft or vehicle, an avionics system, a telemetry or data recording system, a communications system, or any other system where distributed memory synchronized processing may be useful. Additionally, embodiments may be constructed and adapted for use in a manned or unmanned aircraft including avionics, telemetry, communications, navigation systems or a system for use on land or water.

Figure 2:
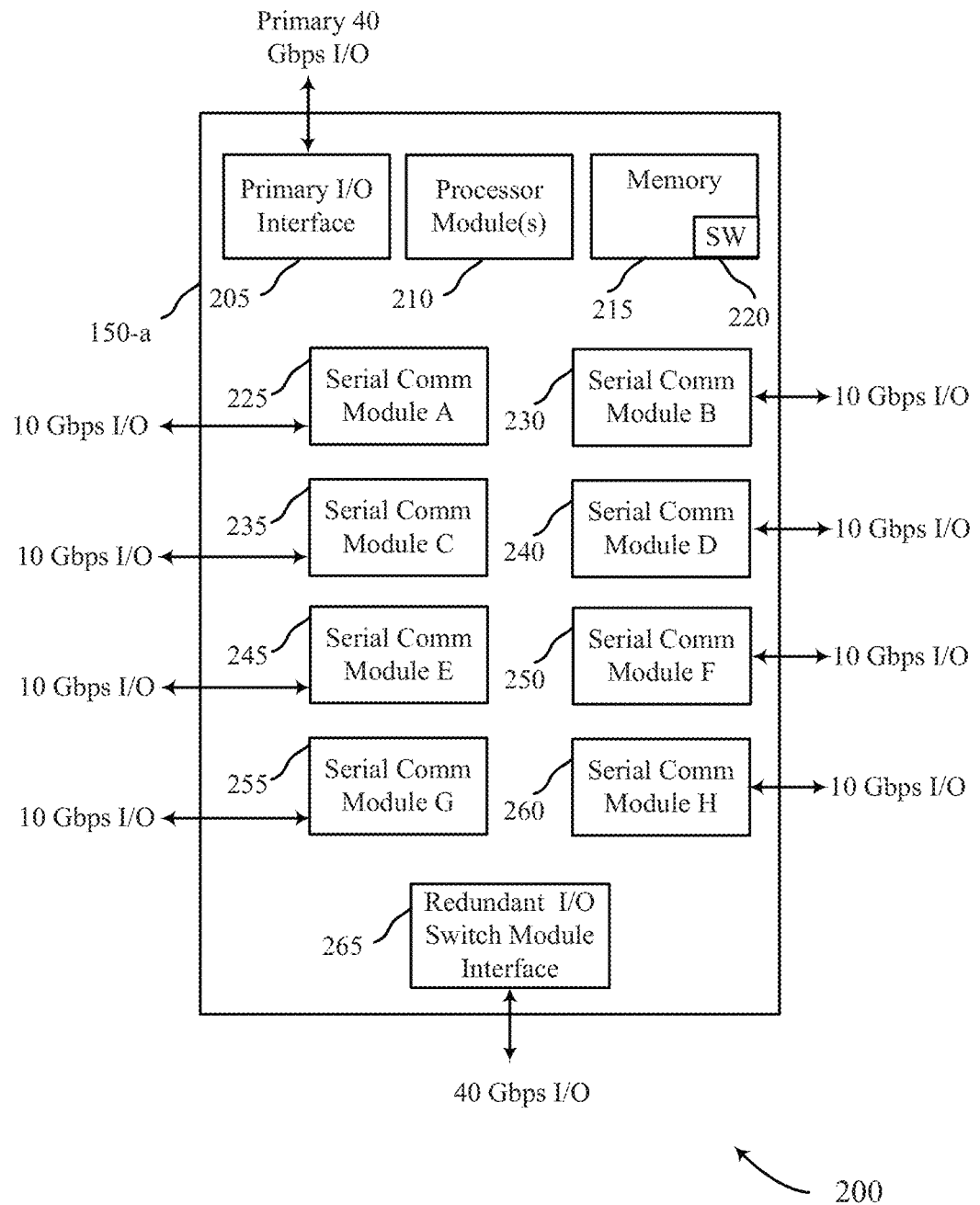
FIG. 2 shows a block diagram of an exemplary I/O module in accordance with various embodiments.

With reference now to FIG. 2, a block diagram illustration of an I/O switching module 200 in accordance with various embodiments is described. In the example of FIG. 2, primary I/O switching module 150-a includes a primary I/O interface 205 which, in various embodiments, provides a primary 40 Gbps I/O interface to one or more external systems. Primary I/O switching module 150-a also includes one or more processor module(s) 210, a memory 215 that contains software 220 for execution by processor module 425, and a number of serial communications modules 225-260. A redundant I/O switch module interface 265 is provided that provides communications to redundant I/O switch module (e.g., module 155 of FIG. 1) which may be present in various embodiments. Redundant I/O switch module interface 265, in some embodiments, provides communications with a redundant I/O switch module, such as module 155 of FIG. 1, at data rates of 40 Gbps, although it will be readily understood that other data rates may be employed according to other embodiments. Such a redundant I/O switch module 155 may include the same components as primary I/O switch module 150-a, and provide redundant capabilities for use in high availability and high reliability applications.

The primary I/O switching module 150-a is connected to each node (e.g., nodes 110-145 of FIG. 1) through a respective serial communications modules 225-260. In this example, eight serial communications modules 225-260 are able to transmit and receive data to and from eight nodes (e.g., nodes 110-145 of FIG. 1). In a set of embodiments, each serial communications module 225-260 is capable of communications at a data rate of 10 Gbps. In some embodiments, data is communicated between nodes and primary I/O switching module 150-a using data packets that include a header and payload. The header may include, for example, address and routing information that relates to the particular node the packet is to be sent to. In one particular example, Serial RapidIO protocol addressing is used, although other protocols may be used, such as PCIE, XAUI, GigE, Infiniband, etc., as well as custom protocols. In some embodiments, each of the communications modules 225-260 includes a serializer/deserializer (SerDes), which provides data transfer for the communications modules 225-260.

The basic SerDes function of some embodiments, as is well known, is made up of two functional blocks: the Parallel In Serial Out (PISO) block (i.e., Parallel-to-Serial converter) and the Serial In Parallel Out (SIPO) block (i.e., Serial-to-Parallel converter). While an example is described here using SerDes, it will be understood that the architecture is not restricted to SerDes and PISO/SIPO, and that other interfaces may be used, such as optical interfaces, for example. The PISO block may have a parallel clock input, a set of data input lines, and input data latches. It may use an internal or external Phase-locked loop (PLL) to multiply the incoming parallel clock up to the serial frequency, for example. In some examples, the PISO has a single shift register that receives the parallel data once per parallel clock, and shifts it out at the higher serial clock rate. Implementations may also have a double-buffered register. The SIPO block, in some embodiments, may have a receive clock output, a set of data output lines and output data latches. The receive clock may be recovered from the data through a serial clock recovery technique. In some embodiments, SerDes may not transmit a clock, and use reference clock to lock the PLL to the correct Tx frequency, avoiding low harmonic frequencies present in the data stream. The SIPO block may then divide the incoming clock down to the parallel rate. Some implementations may have two registers connected as a double buffer, one register used to clock in the serial stream and the other used to hold the data for the slower, parallel side.

Figure 3:
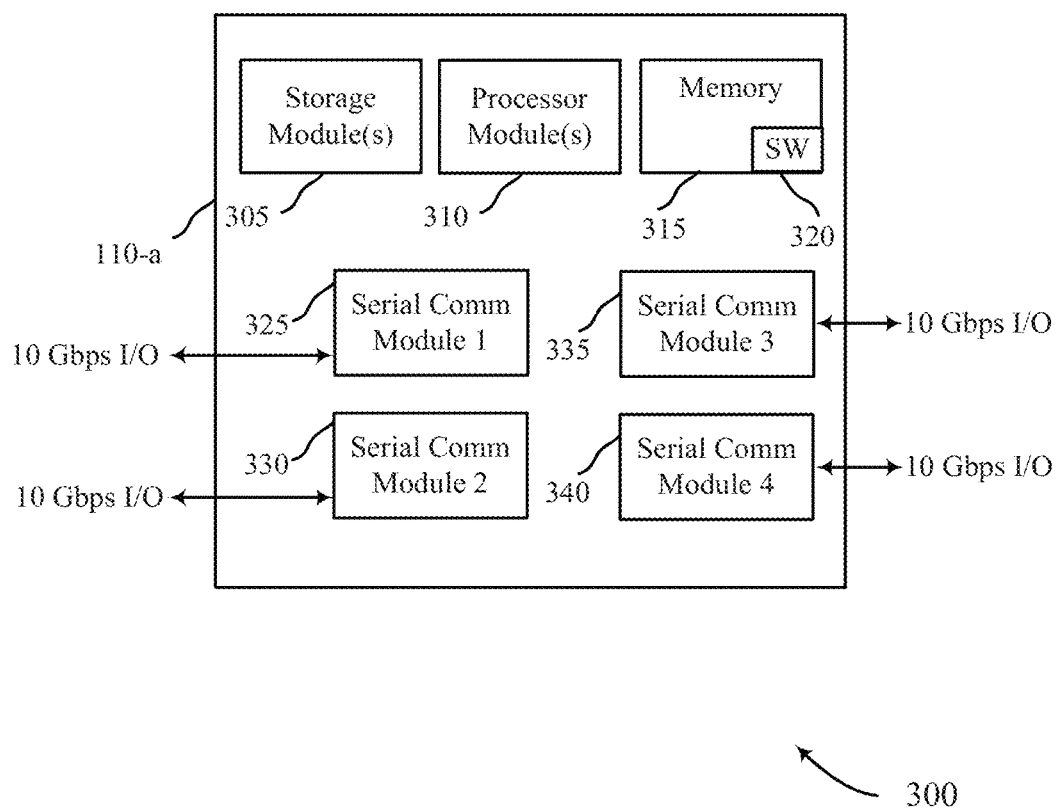
FIG. 3 shows a block diagram of a node module in accordance with various embodiments.

Referring first to FIG. 3, a block diagram illustrates an example of a node 300 in accordance with various embodiments. In the example of FIG. 3, node 110-a includes one or more storage module(s) 305, one or more processor module(s) 310, a memory 315 that contains software 320 for execution by processor module(s) 310, and a number of serial communications modules 325-340. The serial communications modules 325-340, according to various embodiments, are used to provide connections between node 110-a and two other nodes, and each of a primary and redundant I/O switching module. In embodiments such as illustrated in FIGS. 1-2, eight nodes are provided, with each node having a serial communications connection with two other nodes and with each of the primary and redundant I/O switching modules. Such an architecture may provide a fault tolerant, highly reliable, and high performance system that may be used in harsh environmental conditions such as may be encountered in a space environment. The connections to other nodes may provide communications between nodes that is fault tolerant, such that alternative communications paths may be employed in the event of a failure in one or more nodes. Such a failure may be the result of, for example, a radiation-induced malfunction in one or more of the nodes or modules within a node. In the embodiment of FIG. 3, node 110-a includes storage module(s) 305 which may be used for storage of data from one or more external systems, such as one or more satellite systems, for example. In one embodiment, the system includes eight nodes, each of which is configured as illustrated in FIG. 3, to provide a high performance and high reliability solid state recorder. One or more modules, such as module 110-a, may include volatile memory, non-volatile memory, and/or a combination thereof.

Figure 4:
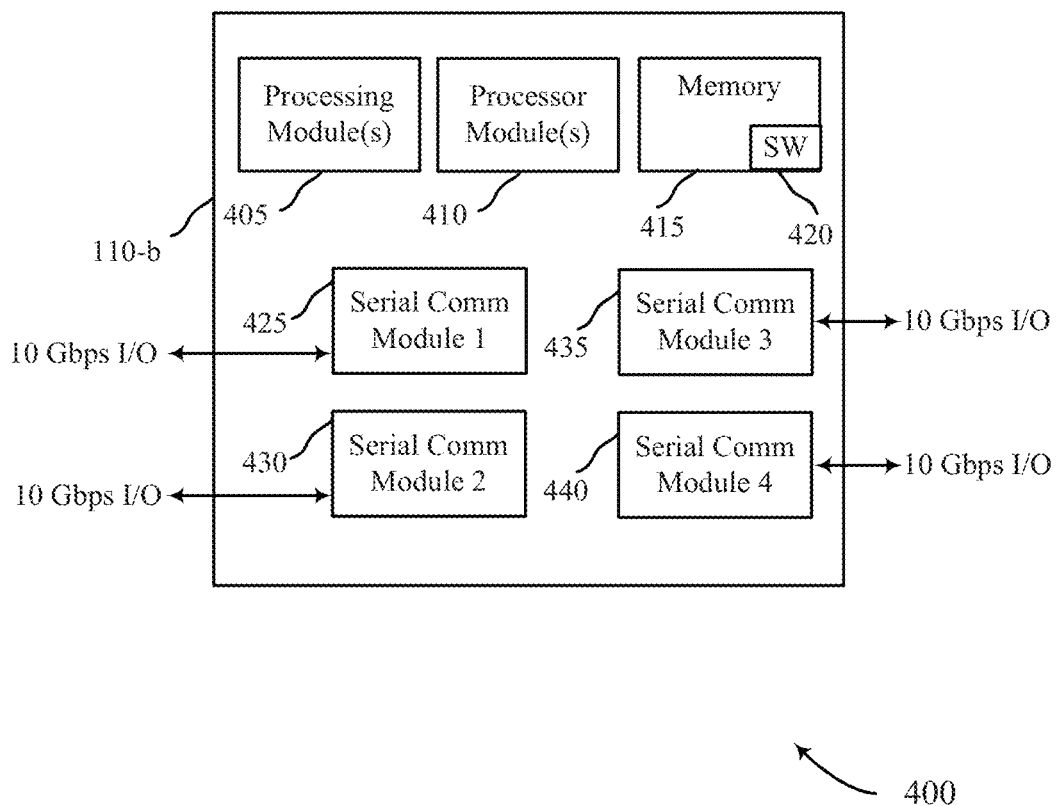
FIG. 4 shows a block diagram of another node module in accordance with various embodiments.
Figure 5:
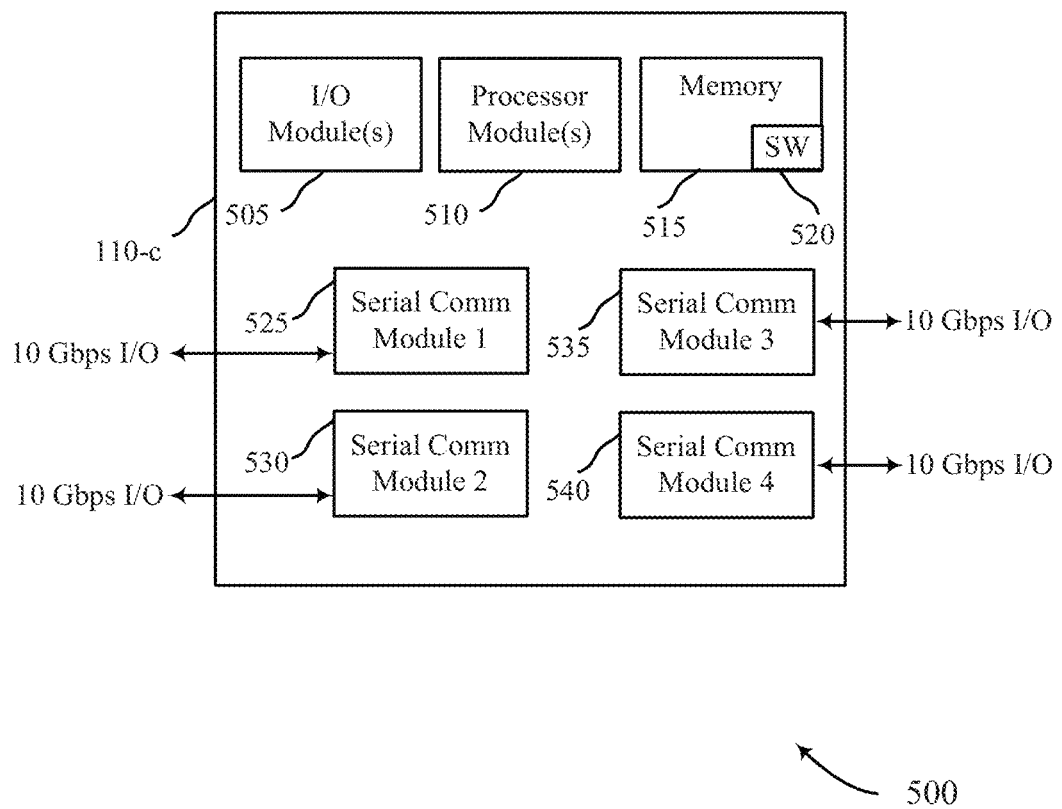
FIG. 5 shows a block diagram of another node module in accordance with various embodiments.

In other embodiments, nodes may be configured to provide processing or I/O functions, rather than storage functions. FIGS. 4 and 5 illustrate block diagrams of nodes 110-b and 110-c, respectively, that may provide processing (FIG. 4) or I/O (FIG. 5) functions. In the example of FIG. 4, node 110-b includes one or more processing module(s) 405, one or more processor module(s) 410, a memory 415 that contains software 420 for execution by processing module(s) 404 and/or processor module(s) 410, and a number of serial communications modules 425-440. In the embodiment of FIG. 4, node 110-b includes processing module(s) 405 which may be used for processing of data or information from one or more external systems, such as one or more satellite systems, for example. Processing module(s) 405 may provide specific processing functions for one or more external systems, while processor module(s) may provide processing functions for communications with other nodes and/or I/O switches. The serial communications modules 425-440, according to various embodiments, are used to provide connections between node 110-b and two other nodes, and each of a primary and redundant I/O switching module, similarly as described above with respect to the node 110-a of FIG. 3.

In the example of FIG. 5, node 110-c includes one or more I/O module(s) 505, one or more processor module(s) 510, a memory 515 that contains software 520 for execution by processor module(s) 510, and a number of serial communications modules 525-540. In the embodiment of FIG. 5, node 110-c includes I/O module(s) 505 which may be used to provide communications with other systems or networks, such as one or more satellite systems and/or one or more other clusters of nodes and I/O modules such as illustrated in FIGS. 1-5, for example. The serial communications modules 425-440, according to various embodiments, are used to provide connections between node 110-c and two other nodes, and each of a primary and redundant I/O switching module, similarly as described above with respect to the node 110-a of FIG. 3 and node 110-b of FIG. 4. In some embodiments, one or more nodes (e.g., nodes 110-145 of FIG. 1) may provide one or more different functions (i.e., processing, storage, or I/O functions) to a system.

Figure 6:
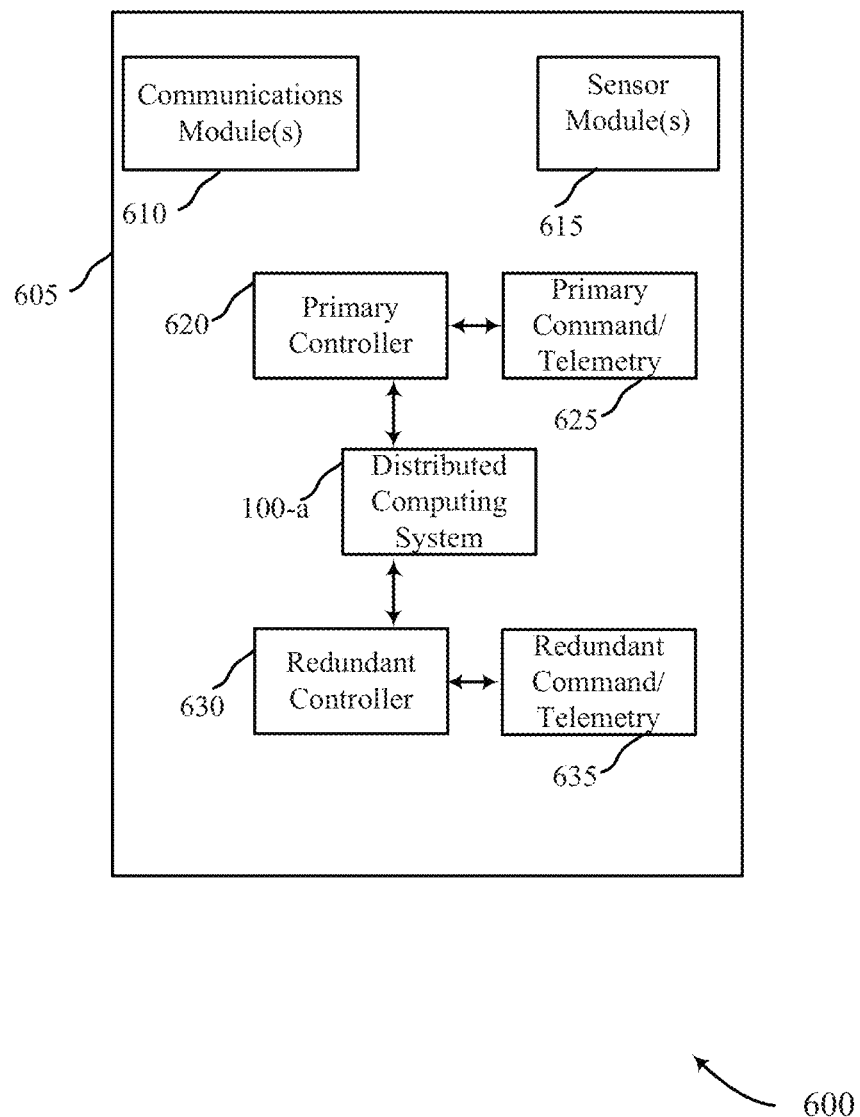
FIG. 6 shows a block diagram of a satellite system in accordance with various embodiments.

With reference now to FIG. 6, a block diagram illustration of a distributed computing system incorporated into a satellite platform 600 in accordance with various embodiments is described. In this example, a distributed computing system 100-a, such as described with respect to FIGS. 1-5, is included as part of a satellite platform 605. The satellite 605 may include communications module(s) 610, sensor module(s) 615, and distributed computing system 100-a. In the example of FIG. 6, distributed computing system 100-a is coupled with a primary controller 620 which is coupled with a primary command/telemetry unit 625. Distributed computing system 100-a is also coupled with a redundant controller 630 which is coupled with a redundant command/telemetry unit 635. In some embodiments, the primary I/O switching module is coupled with the primary controller 620, and the redundant I/O switching module is coupled with the redundant controller 630. In such a manner, redundant satellite systems are coupled with redundant systems in the distributed computing system 110-a to provide a highly reliable and fault tolerant satellite system 605. Such a redundant system may be used to provide highly reliable systems capable of withstanding a failure in one or more nodes and/or switches of distributed computing system 110-a, for example. Such a failure may be the result of, for example, a radiation-induced malfunction in one or more of the electronic components of the satellite platform 600.

Figure 7:
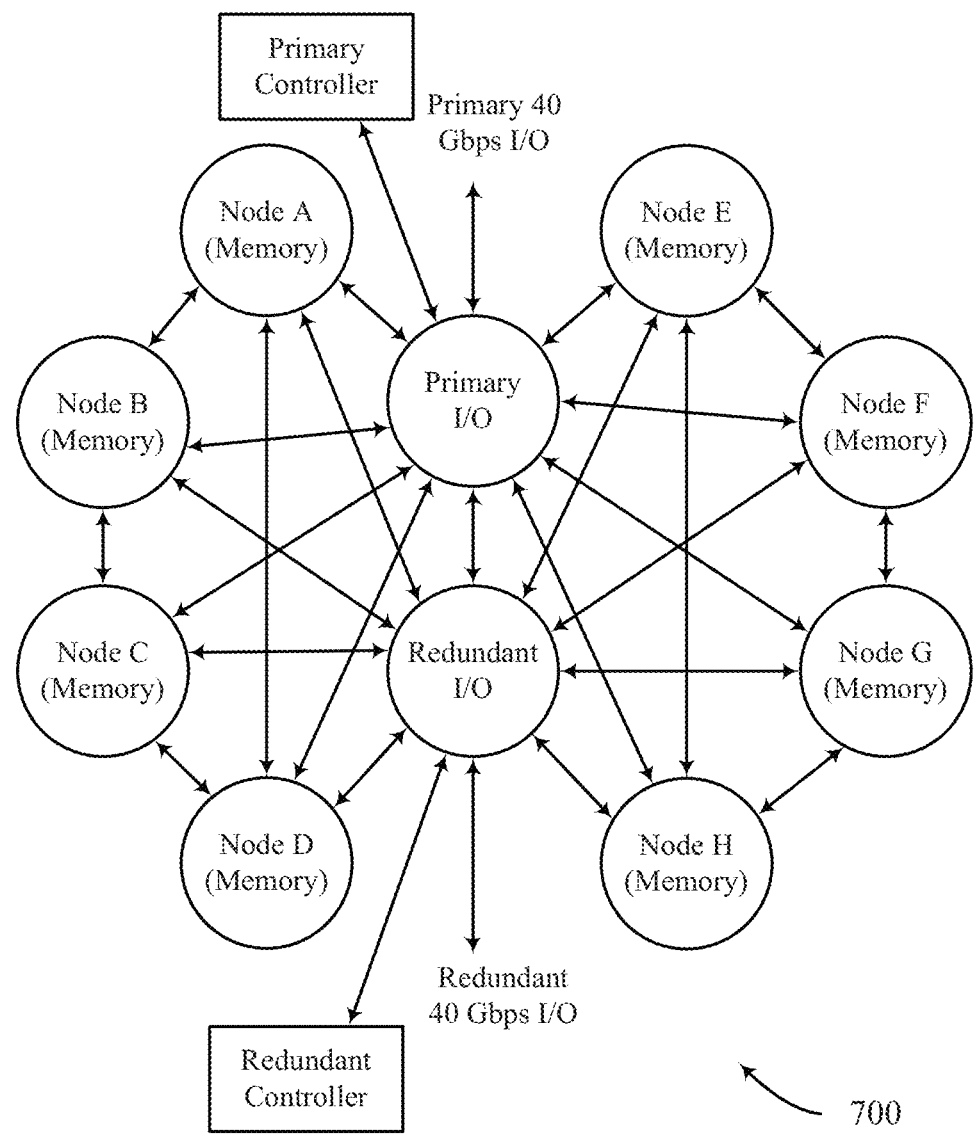
FIG. 7 shows a block diagram of a distributed computing system in accordance with various embodiments.

Distributed computing systems such as described with respect to FIGS. 1-6 may be implemented in mash-type architectures to provide various different system functionalities. For example, FIG. 7 illustrates a distributed computing system 700 of an embodiment that is implemented as a solid state recorder. The system 700 of this embodiment, similarly as discussed above, may use serial interconnects to connect nodes and I/O switches, which may use an internal communications protocol. The components are configured in a topology for redundancy and high reliability. The architecture of this embodiment uses a depleted mesh topology that allows redundant interconnect between nodes within the system, as illustrated by the arrows between components. Arrows between components, according to various embodiments, may use a SerDes based network to construct a highly reliable fault tolerant memory and/or computing system for use in a space system (such as a satellite). As will be recognized, the system is memory, processor, I/O and even network protocol agnostic. There are multiple levels of redundancy in the system 700 that may be enhanced for high performance in the environmental conditions found in space (radiation, thermal, etc.). As depicted the Primary I/O Switch has a SerDes connection to all other nodes in the system (in this example memory nodes) except for the Redundant I/O. Similarly the Redundant I/O Switch has a SerDes connection to all nodes in the system except the Primary I/O Switch. There is a direct point to point high-speed SerDes link between every adjacent node in the system, providing an alternate path from any I/O or node to any other node with non-uniform network hops. This configuration provides four separate interfaces to each node.

Figure 8:
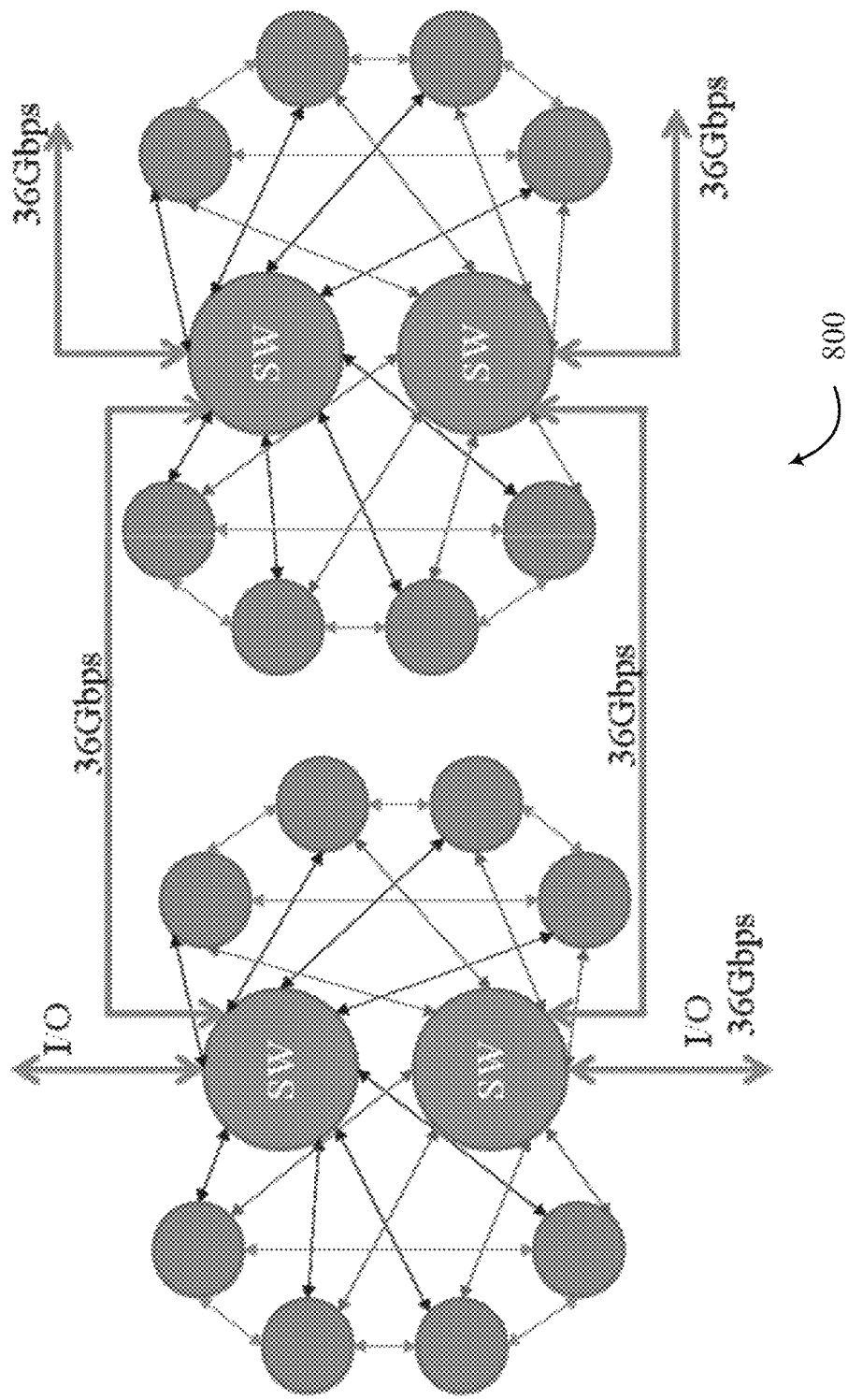
FIG. 8 shows a block diagram of a distributed computing system in accordance with other various embodiments.
Figure 9:
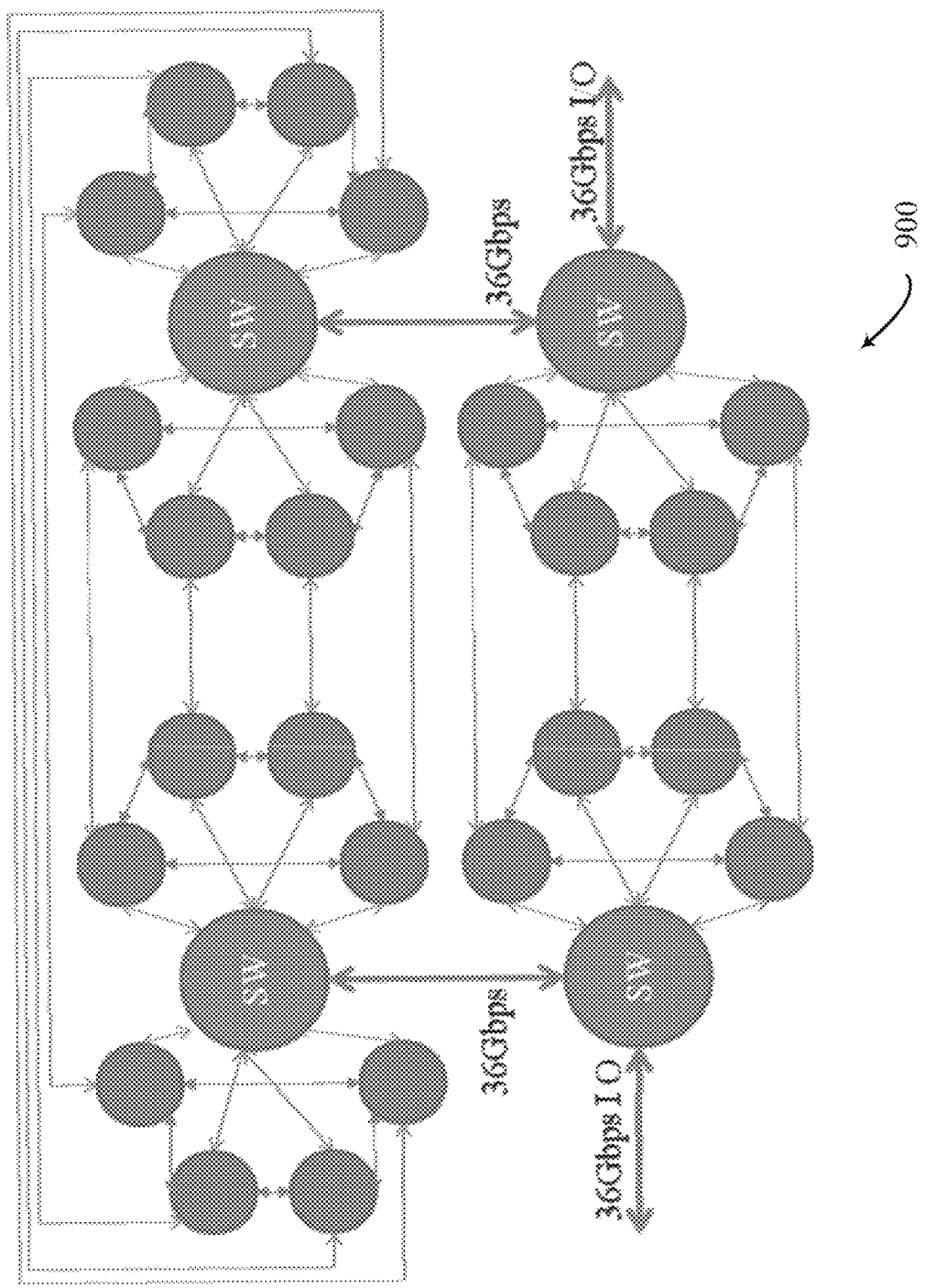
FIG. 9 shows a block diagram of a distributed computing system in accordance with other various embodiments.

Such an architecture also allows customization of system input and output structures to gain access to the internal mesh network via either a mezzanine or direct connection using a node in the mesh, for example. Examples of specific node designs include, but are not limited to, 1) data storage using volatile memory technology, 2) data storage using non-volatile memory technology, 3) data processing based on processor, ASIC, and/or FPGA technology, and 4) with digital and/or mixed signal I/O capability. The technology required to implement the architecture may be employed in any device that supports SerDes. This could be, for example, discrete components, FPGAs and/or custom ASICs including radiation hardened and/or commercial off the shelf (COTS) electronic components. FIGS. 8 and 9 provide two examples of extensions of the architecture. In the example of FIG. 8, system 800 provides a high-bandwidth interconnection between primary and redundant I/O switches of two distributed computing systems, thereby providing a high performance system with enhanced capabilities relative to a system employing a single cluster of nodes. In the example of FIG. 9, system 900 provides multiple clusters in which nodes in each cluster are interconnected with a node of a neighboring cluster as well as another node within the same cluster. Such a configuration may provide additional redundancy for a high availability and high reliability system.

Figure 10:
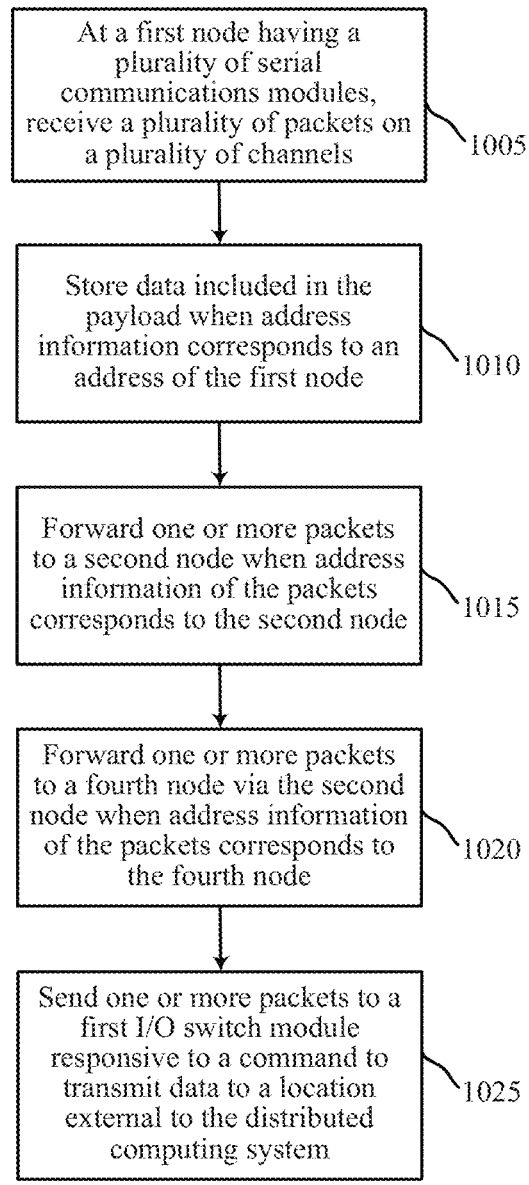
FIG. 10 shows exemplary operational steps of a method in accordance with other various embodiments.

With reference now to FIG. 10, a flow chart illustrating the operational steps 1000 of various embodiments is described. The operational steps 1000 may, for example, be performed by one or more components of FIGS. 1-9, or using any combination of the devices described for these figures. Initially, at block 1005, at a first node having a plurality of serial communications modules, a plurality of packets are received on a plurality of channels, each packet comprising a header with address information and a payload. In some embodiments, similarly as described above, the plurality of serial communications modules may be coupled with a second node, a third node, and a first I/O switch module. Data included in the payload is stored, according to block 1010, when address information corresponds to an address of the first node. For example, the packet header information may indicate that data from the payload is to be stored in a memory module associated with the first node. At block 1015, one or more packets are forwarded to the second node when address information of the packets corresponds to the second node. One or more packets are forwarded to a fourth node via the second node when address information of the packets corresponds to the fourth node, as indicated at block 1020. One or more packets are sent to the first I/O switch module responsive to a command to transmit data to a location external to the distributed computing system, at block 1025. In such a manner, data may be communicated to different components of the system through one or more different alternate paths. Such a configuration provides redundancy and may provide an available path for data communications in the event of a failure of one or more components of the system.

Figure 11:
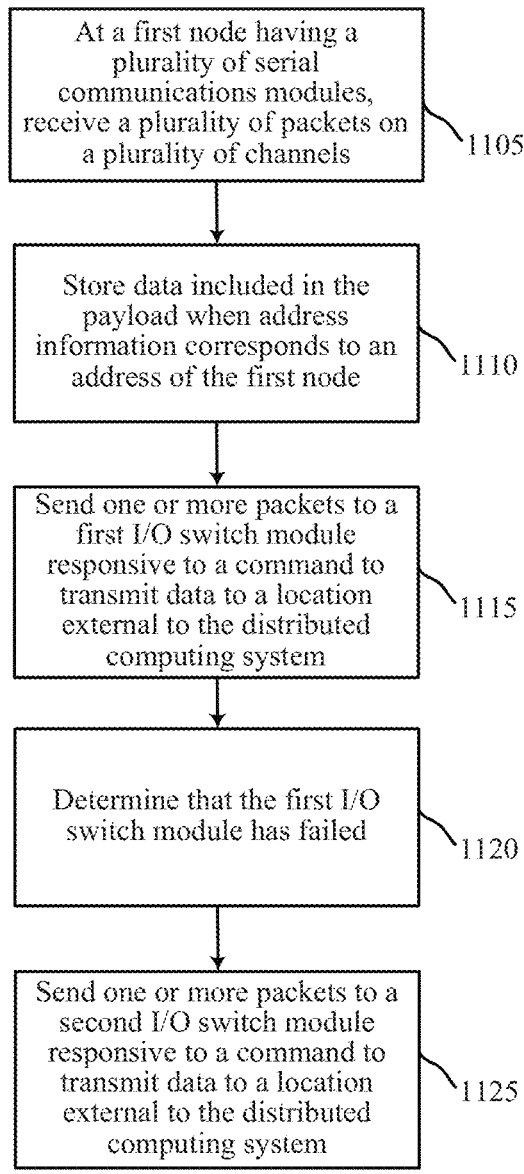
FIG. 11 shows exemplary operational steps of a method in accordance with other various embodiments.

With reference now to FIG. 11, a flow chart illustrating the operational steps 1100 of various embodiments is described. The operational steps 1100 may, for example, be performed by one or more components of FIGS. 1-9, or using any combination of the devices described for these figures. Initially, at block 1105, at a first node having a plurality of serial communications modules, a plurality of packets are received on a plurality of channels, each packet comprising a header with address information and a payload. In some embodiments, similarly as described above, the plurality of serial communications modules may be coupled with a second node, a third node, and a first I/O switch module. Data included in the payload is stored, according to block 1110, when address information corresponds to an address of the first node. For example, the packet header information may indicate that data from the payload is to be stored in a memory module associated with the first node. One or more packets are sent to the first I/O switch module responsive to a command to transmit data to a location external to the distributed computing system, at block 1115. At block 1120, it is determined that the first I/O switch module has failed. Such a determination may be made through, for example, the first I/O switch being unresponsive to any communications requests. The failure may be the result of any of a number of situations. For example, in systems operating in a space environment, radiation effects such as described above may impact communications on part of the spacecraft, resulting in a temporary failure of communications between two or more components. Failures may also be permanent, such as damage to one or more components resulting in the loss of operation of the component. Such permanent failures may be, for example, radiation induced or the result of elevated thermal environments as may be found in space vehicles. In any event, in the result of a failure of the first I/O switch, one or more packets are sent to a second I/O switch module responsive to a command to transmit data to a location external to the distributed computing system, as indicated at block 1125. In the examples of FIGS. 10 and 11, the various operational steps may be performed at system such as described above, in which a distributed computing system comprises eight nodes, and each of the nodes is coupled with two other nodes, the I/O switch, and secondary (or redundant) I/O switch. The I/O switches may be coupled with primary/redundant controllers, to provide redundant systems. In some embodiments, connections between each of the nodes may have different data rates than a data rate of the external I/O interfaces.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described components and techniques. These techniques, however, may be practiced without these specific details. In some instances, well-known structures and devices are shown in block diagram form in order to avoid obscuring the concepts of the described embodiments.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A distributed multi-mesh computing apparatus, comprising:
   a primary mesh including a primary input/output (I/O) switch module and multiple primary nodes;
   a redundant mesh including a redundant I/O switch module and multiple redundant nodes;
       wherein the primary and redundant I/O switch modules each include:
           an external I/O interface configured to communicate with one or more systems external to the distributed multi-mesh computing apparatus,
               wherein each external I/O interface is configured to communicate with the one or more systems external to the distributed multi-mesh computing apparatus via external interconnects responsive to commands directing the corresponding I/O switch module to transmit data to or access data from the one or more external systems, and
           multiple communications modules configured to transmit and receive data over multiple communication channels,
       wherein the redundant I/O switch module is configured to be activated when the primary I/O switch module encounters a fault;
       wherein each node of the multiple primary nodes includes:
           primary communications modules; and
           one or more of a memory module, a processing module, or an input/output (I/O) module,
               wherein each of the primary communications modules is communicatively coupled to transmit and receive data to and from at least two other primary nodes and the primary I/O switch over the multiple communication channels via primary node interconnects, and
               wherein one or more of the multiple primary nodes are redundant and configured to be activated when another primary node encounters a fault,
       wherein each node of the multiple redundant nodes includes:
           redundant communications modules; and
           one or more of a memory module, a processing module, or an input/output (I/O) module,
               wherein each of the redundant communications modules is communicatively coupled to transmit and receive data to and from at least two other redundant nodes and the redundant I/O switch module over the multiple channels via redundant node interconnects, and
               wherein one or more of the multiple redundant nodes is redundant and configured to be activated when another redundant node encounters a fault, and
           wherein each node of the multiple primary nodes is interconnected with a corresponding node of the multiple redundant nodes;
       wherein the primary and redundant meshes collectively provide the distributed computing apparatus with high reliability and fault-tolerance in space environments.

2. The apparatus of claim 1, wherein one or more of the primary and redundant communications modules transmit and receive data in data packets, the data packets comprising a header with address information and a payload.

3. The apparatus of claim 1, wherein one or more of the primary and redundant communications modules includes a serializer/deserializer module.

4. The apparatus of claim 1, wherein the primary and redundant node interconnects operate at data rates different than data rates of the external interconnects.

5. The apparatus of claim 4, wherein the external interconnects support a higher data rate than the data rates of the primary and redundant node interconnects.

6. The apparatus of claim 1, wherein the primary I/O switch is communicatively coupled with a primary controller and the redundant I/O switch is communicatively coupled with a redundant controller.

7. The apparatus of claim 1, wherein the primary and redundant meshes are housed in a vehicle configured for use in a space environment.

8. The apparatus of claim 1, wherein the one or more of the multiple primary and redundant nodes comprise memory modules.

9. The apparatus of claim 8, wherein the memory modules and the primary or redundant I/O switch module form a solid state recorder.

10. The apparatus of claim 8, wherein a first subset of the multiple primary and redundant nodes comprise non-volatile memory modules and a second subset of the multiple primary and redundant nodes comprise volatile memory modules.

11. The apparatus of claim 1, wherein the multiple primary nodes comprise eight nodes, each node comprising four communications modules, and wherein two of the communications modules are coupled with other primary nodes, and two of the communications modules are coupled with the primary I/O switch module.

12. A satellite platform apparatus, comprising:
   a distributed computing system including primary and redundant meshes, the primary mesh including a primary input/output (I/O) switch module and multiple primary nodes, the redundant mesh including a redundant I/O switch module and multiple redundant nodes,
       wherein the primary and the redundant I/O switch modules each include:
           an external I/O interface configured to communicate with one or more systems external to the distributed computing apparatus via node interconnects responsive to commands directing the corresponding I/O switch module to transmit data to or access data from the one or more external systems; and multiple communications modules configured to transmit and receive data over multiple channels, and wherein the redundant I/O switch module is configured to be activated when the primary I/O switch module is unavailable due to a fault;

wherein each node of the multiple primary nodes includes:

primary communications modules; and one or more of a memory module, a processing module, or an I/O module, wherein each of the primary communications modules is communicatively coupled to transmit and receive data to and from at least two other primary nodes and the primary I/O switch over the multiple communication channels via primary node interconnects, wherein one or more of the multiple primary nodes are redundant and are configured to be activated when another primary node encounters a fault, and wherein each node of the multiple redundant nodes includes:

redundant communications modules; and one or more of a memory module, a processing module, or an I/O module, wherein each of the redundant communications modules is communicatively coupled to transmit and receive data to and from at least two other redundant nodes and the redundant I/O switch module over the multiple communication channels via redundant node interconnects, and wherein one or more of the multiple redundant nodes is redundant and configured to be activated when another redundant node encounters a fault, and wherein each node of the multiple primary nodes is interconnected with a corresponding node of the multiple redundant nodes;

wherein the multiple primary and redundant nodes collectively provide the distributed computing apparatus with high reliability and fault-tolerance in space environments;

a primary controller communicatively coupled to a primary telemetry unit and configured to activate and deactivate the primary I/O switch module and one or more of the multiple primary nodes; and a redundant controller communicatively coupled to a redundant telemetry unit and configured to activate and deactivate the redundant I/O switch module and one or more of the multiple redundant nodes.

13. The apparatus of claim 12, wherein one or more of the primary and redundant communications modules are further configured to transmit and receive communications to and from the redundant I/O switch module when the primary I/O switch module is unavailable.

14. The apparatus of claim 12, one or more of the primary and redundant communications modules are configured to:
receive packets of data each comprising a header with address information and a payload;
forward one or more packets to another node based on the address information;
determine a failure of the another node as a result of radiation effects of a space environment; and
forward the one or more packets to yet another node responsive to the failure.

15. The apparatus of claim 12, further comprising the primary telemetry unit and the redundant telemetry unit.

16. A multi-mesh distributed computing system facilitating high reliability and fault-tolerance in space environments, the system comprising:

a primary mesh including a primary input/output (I/O) switch module and primary nodes;

a redundant mesh including a redundant I/O switch module and redundant nodes;

wherein the primary and redundant I/O switch modules each include:

an external I/O interface configured to communicate with one or more systems external to the distributed multi-mesh computing system, wherein each external I/O interface is configured to communicate with the one or more systems external to the distributed multi-mesh computing system via external interconnects responsive to commands directing the corresponding I/O switch module to transmit data to or access data from the one or more external systems, and communications modules configured to transmit and receive data over communication channels, wherein the redundant I/O switch module is configured to be activated when the primary I/O switch module encounters a fault;

wherein each node of the primary nodes includes:

primary communications modules communicatively coupled to transmit and receive data to and from at least two other primary nodes and the primary I/O switch-over the communication channels via primary node interconnects, and wherein one or more of the primary nodes are redundant and configured to be activated when another primary node encounters a fault, wherein each node of the redundant nodes includes:

redundant communications modules communicatively coupled to transmit and receive data to and from at least two other redundant nodes and the redundant I/O switch module over the communications channels via redundant node interconnects, and wherein one or more of the redundant nodes is redundant and configured to be activated when another redundant node encounters a fault, and wherein each node of the multiple primary nodes is interconnected with a corresponding node of the multiple redundant nodes.

17. The system of claim 16, wherein the primary and redundant node interconnects operate at data rates different than data rates of the external interconnects.

18. The system of claim 17, wherein the external interconnects support a higher data rate than the data rates of the primary and redundant node interconnects.

19. The system of claim 16, wherein the primary and redundant meshes are housed, at least in part, in a vehicle configured for use in a space environment.

20. The system of claim 19, further comprising:
a primary controller communicatively coupled to a primary telemetry unit and configured to activate and deactivate the primary I/O switch module and one or more of the multiple primary nodes; and
a redundant controller communicatively coupled to a redundant telemetry unit and configured to activate and deactivate the redundant I/O switch module and one or more of the multiple redundant nodes.

21. The system of claim 20, further comprising the primary telemetry unit and the redundant telemetry unit.

22. The system of claim 16, wherein the memory modules and the primary or redundant I/O switch module form a solid state recorder.

23. The system claim 22, wherein a first subset of the multiple primary and redundant nodes comprise non-volatile memory modules and a second subset of the multiple primary and redundant nodes comprise volatile memory modules.

* * * * *